(12) United States Patent
Gorobinskiy (10) Patent No.: US 7,514,167 B2
(45) Date of Patent: Apr. 7, 2009

(54) CATALYST FOR A WATER GAS SHIFT FOR A FUEL CELL SYSTEM, A METHOD OF PREPARING THE SAME, AND A FUEL CELL SYSTEM INCLUDING THE SAME

(75) Inventor: Leonid Gorobinskiy, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 8 days.

(21) Appl. No.: 11/655,406

(22) Filed: Jan. 19, 2007

(65) Prior Publication Data
US 2007/0190376 A1    Aug. 16, 2007

(30) Foreign Application Priority Data
Feb. 10, 2006    (KR) .................. 10-2006-0013020

(51) Int. Cl.
*H01M 8/18* (2006.01)
*B01J 21/16* (2006.01)
(52) U.S. Cl. .................. 429/20; 502/80; 502/84
(58) Field of Classification Search ............ 502/80, 502/84; 429/19, 20
See application file for complete search history.

(56) References Cited

U.S. PATENT DOCUMENTS

| 6,627,572 B1 * | 9/2003 | Cai et al. ............... 502/84 |
|---|---|---|
| 6,638,892 B1 | 10/2003 | Wu et al. |
| 2002/0041842 A1 * | 4/2002 | Ruettinger et al. ........ 423/230 |
| 2004/0110634 A1 | 6/2004 | LaBarge et al. |
| 2004/0209131 A1 * | 10/2004 | Bolton et al. ............. 429/17 |

FOREIGN PATENT DOCUMENTS

| CN | 1271330 A | 10/2000 |
|---|---|---|
| EP | 1 426 330 A1 | 6/2004 |
| KR | 2000-0073252 | 12/2000 |
| KR | 2000-0075395 | 12/2000 |
| KR | 2003-0044329 | 6/2003 |
| KR | 2003-0048274 | 6/2003 |
| KR | 2003-0075512 | 9/2003 |
| KR | 10-2004-0038911 | 5/2004 |
| WO | WO 02/085783 A2 | 10/2002 |

OTHER PUBLICATIONS

Korean Patent Abstracts, Publication No. 1020030044329 A; Date of Publication: Jun. 9, 2003; in the name of Wang Seok Cha et al.
Korean Patent Abstracts, Publication No. 1020030048274 A; Date of Publication: Jun. 19, 2003; in the name of Wang Seok Cha et al.
Korean Patent Abstracts, Publication No. 1020030075512 A; Date of Publication: Sep. 26, 2003; in the name of Wang Seok Cha et al.

(Continued)

*Primary Examiner*—Patrick Ryan
*Assistant Examiner*—Muhammad Siddiquee
(74) *Attorney, Agent, or Firm*—Christie, Parker & Hale, LLP (57) ABSTRACT

The water gas shift catalyst for a reformer of a fuel cell system where a supporter includes a clay and ZnO filled between layers of the clay; and an active material including CuO supported on the supporter.

16 Claims, 5 Drawing Sheets

OTHER PUBLICATIONS

Korean Patent Abstracts, Publication No. 1020000073252 A; Publication Date: Dec. 5, 2000; in the name of Choi, et al.

Korean Patent Abstracts, Publication No. 1020000075395 A; Publication Date: Dec. 15, 2000; in the name of Hwang, et al.

* cited by examiner

CATALYST FOR A WATER GAS SHIFT FOR A FUEL CELL SYSTEM, A METHOD OF PREPARING THE SAME, AND A FUEL CELL SYSTEM INCLUDING THE SAME

CROSS-REFERENCE TO RELATED APPLICATION

This application claims priority to and the benefit of Korean Patent Application No. 10-2006-0013020 filed in the Korean Intellectual Property Office on Feb. 10, 2006, the entire content of which is incorporated herein by reference.

BACKGROUND OF THE INVENTION (a) Field of the Invention

The present invention relates to a catalyst for water gas shift for a reformer of a fuel cell system, a method of preparing the same, and a fuel cell system including the same.

(b) Description of the Related Art

A fuel cell is a power generation system for producing electrical energy through an electrochemical redox reaction of an oxidant and a fuel such as hydrogen, or a hydrocarbon-based material, such as methanol, ethanol, natural gas, and the like. Such a fuel cell is a clean energy source that can replace fossil fuels. It includes a stack composed of unit cells and produces various ranges of power output. Since it has four to ten times higher energy density than a small lithium battery, it has been highlighted as a small portable power source.

Representative exemplary fuel cells include a polymer electrolyte membrane fuel cell (PEMFC) and a direct oxidation fuel cell (DOFC). The direct oxidation fuel cell includes a direct methanol fuel cell that uses methanol as a fuel.

The polymer electrolyte fuel cell has advantages of a high energy density and high power, but it also has problems in the need to carefully handle hydrogen gas and the requirement for accessory facilities such as a fuel reforming processor for reforming methane or methanol, natural gas, and the like in order to produce hydrogen as the fuel gas.

On the contrary, a direct oxidation fuel cell has lower energy density than that of the polymer electrolyte fuel cell, but has the advantages of easy handling of the polymer electrolyte fuel cell, a low operation temperature, and no need for additional fuel reforming processors.

In the above-mentioned fuel cell system, a stack that generates electricity substantially includes several to many unit cells stacked adjacent to one another, and each unit cell is formed of a membrane-electrode assembly (MEA) and a separator (also referred to as a bipolar plate). The membrane-electrode assembly is composed of an anode (also referred to as a "fuel electrode" or an "oxidation electrode") and a cathode (also referred to as an "air electrode" or a "reduction electrode") that are separated by a polymer electrolyte membrane.

A fuel is supplied to an anode and adsorbed on catalysts of the anode, and the fuel is oxidized to produce protons and electrons. The electrons are transferred into a cathode via an external circuit, and the protons are transferred into the cathode through the polymer electrolyte membrane. In addition, an oxidant is supplied to the cathode, and then the oxidant, protons, and electrons are reacted on catalysts of the cathode to produce electricity along with water.

A fuel cell system is composed of a stack, a reformer, a fuel tank, and a fuel pump. The stack forms a body of the fuel cell system, and the fuel pump provides the fuel stored in the fuel tank to the reformer. The reformer reforms the fuel to generate the hydrogen gas and supplies the hydrogen gas to the stack.

A reformer of a general fuel cell system includes a reforming reaction portion that generates hydrogen gas from a fuel through a catalyst reforming reaction using heat energy, and a carbon monoxide reducing portion that reduces carbon monoxide concentration in the hydrogen gas through an oxidation reaction of hydrogen gas with the oxidant. Such a reforming reaction is performed by a reforming catalyst, and therefore there is a great deal of research being undertaken regarding reforming catalysts.

SUMMARY OF THE INVENTION

One embodiment of the present invention provides a water gas shift catalyst having excellent water gas shift efficiency for a reformer of a fuel cell system.

Another embodiment of the present invention provides a method for preparing the carbon monoxide oxidizing catalyst.

Yet another embodiment of the present invention provides a membrane-electrode assembly for a fuel cell including the water gas shift catalyst.

According to one embodiment of the present invention, a water gas shift catalyst for a reformer of a fuel cell system includes a supporter including a clay, and ZnO filled between layers of the clay; and an active material including CuO supported on the supporter.

According to another embodiment of the present invention, a water gas shift catalyst that includes a clay; and ZnO and CuO filled between layers of the clay is provided.

According to yet another embodiment of the present invention, a method of preparing a water gas shift catalyst is provided. The method includes adding a clay to a Zn compound solution; adding a base to the mixture to perform hydrolysis; drying the hydrolyzed product to prepare a supporter; adding a Cu precursor solution to the supporter; and subjecting the mixture to calcination.

According to yet another embodiment of the present invention, a fuel cell system is provided. The fuel cell system includes a reformer including a reforming reaction portion that generates hydrogen gas from a fuel through a catalyst reforming reaction using heat energy, and a carbon monoxide reducing portion that reduces carbon monoxide concentration in the hydrogen gas through an oxidation reaction of hydrogen gas the with the oxidant; at least one electricity generating element for generating an electrical energy by electrochemical reactions of the hydrogen gas and the oxidant; a fuel supplier for supplying the fuel to the reforming reaction portion; an oxidant supplier for supplying the oxidant to the carbon monoxide reduction portion and electricity generating element; and a cooler for cooling heat generated from the carbon monoxide reduction portion by circulating the fuel supplied to the reforming reaction portion, to the carbon monoxide reduction portion. The reformer includes the above water gas shift catalyst.

DETAILED DESCRIPTION

According to one embodiment of the present invention, a water gas shift catalyst for a reformer of a fuel cell system is provided. A fuel cell system generally includes an electricity generating element and a fuel supplier. A polymer electrolyte fuel cell further includes a reformer for generating hydrogen gas by reforming fuel.

The reformer includes a reforming reaction portion that generates hydrogen gas from the fuel through a catalyst reforming reaction by heat energy, and a carbon monoxide reduction portion for reducing the concentration of carbon monoxide included in the hydrogen gas.

In the carbon monoxide reduction portion, a water gas shift reaction is performed. The water gas shift reaction is performed to reduce the concentration of carbon monoxide included in the hydrogen gas.

According to an embodiment of the present invention, a water gas shift catalyst includes a supporter including a clay and ZnO filled between layers of the clay, and an active material including CuO supported on the supporter. The clay filled with ZnO is referred to as pillared clay.

In addition, according to another embodiment of the present invention, a water gas shift catalyst includes a clay; and ZnO and CuO filled between layers of the clay.

In one embodiment, distance between the layers of the clay may be about 13 Å before being filled with ZnO, but then, becomes 16 to 18 Å after being filled with ZnO (alternatively, with CuO).

According to one embodiment of the present invention, the amount of CuO supported on a supporter may be in a range of 20 to 40 wt %. According to another embodiment of the present invention, the amount may be in a range of 25 to 30 wt %.

When CuO is supported in an amount of less than 20 wt %, there is a problem of a low concentration of active sites, whereas, when more than 40 wt %, there is a problem of low stability of the catalyst.

In addition, according to an embodiment of the present invention, a water gas shift catalyst includes 20 to 40 wt % of ZnO and 20 to 40 wt % of CuO. According to another embodiment of the present invention, it may include 25 to 30 wt % of ZnO and 25 to 30 wt % of CuO. When ZnO is included in an amount of less than 20 wt %, there is a problem of low stability of the catalyst at the reaction temperature, whereas when the amount is more than 40 wt %, there is a problem of excessively low content of the active copper component. In addition, when CuO is included in an amount of less than 20 wt %, there is a problem of low concentration of active sites, whereas when more than 40 wt %, there is a problem of low stability of the catalyst. Since the water gas shift catalyst consists of clay, ZnO and CuO, an amount of the clay may be a valence obtained by subtracting the amounts of ZnO and CuO from the total amount.

According to one embodiment of the present invention, a water gas shift catalyst may additionally include Cu, Au, Ru, Pt, Na, Ca, K, or a mixture thereof. The Cu, Au, Ru, or Pt among the additives may be included in an amount of 1 to 5 parts by weight based on 100 parts by weight of a water gas shift catalyst. According to another embodiment of the present invention, they may be included in an amount of 2.5 to 3 parts by weight. When the Cu, Au, Ru, or Pt is included in an amount of less than 1 part by weight, they may have little effects, while when more than 5 parts by weight, copper activity may decrease more than catalyst activity may increase. In an additional embodiment, Na, Ca, or K among the additives may be included in an amount of 0.01 to 0.5 parts by weight based on 100 parts by weight of a water gas shift catalyst. According to another embodiment of the present invention, it may be included in an amount of 0.1 to 0.2 parts by weight.

According to the embodiment of the present invention, since a supporter including clay filled with ZnO between the layers of the clay may be nano particles, it may have a large reaction specific surface area and excellent catalyst activity. In addition, since ZnO and CuO are uniformly mixed, the supporter may be very stable.

A method of preparing a water gas shift catalyst of the present invention includes adding a clay to a Zn compound solution. In one embodiment, the Zn compound may include Zn nitrate, Zn acetate, or Zn chloride. Herein, a solvent can include water.

Non-limiting examples of the clay include pyrophylite-talc, montmorillonite (MMT), hectorite, fluorohectorite, saponite, kaolinite, vermiculite, illite, mica, brittle mica, or mixtures thereof.

According to the embodiment of the present invention, a Zn compound may be included in an amount of $1\times10^{-3}$ to $5\times10^{-3}$ M based on 1 g of clay, but according to still another embodiment of the present invention, it may be included in an amount of $2\times10^{-3}$ to $3\times10^{-3}$ M. When Zn is included in an amount of less than $1\times10^{-3}$ M, the Zn contents may tend to be too small in a transformed clay. Whereas, when more than $5\times10^{-3}$ M, Zn contents may be too much in a transformed clay.

Next, a base is added to the obtained Zn and clay mixture, and thereafter, the mixture is hydrolyzed. In one embodiment, the base may include ammonium hydroxide ($NH_4OH$), NaOH, KOH, RbOH, or CsOH, or a mixture thereof.

In an embodiment, the base is added in an amount of 1 to 1.2M based on 1M of Zn, but according to another embodiment of the present invention, it may be added in an amount of 1.05 to 1.15M. When the base is added in an amount of less than 1M, the Zn compound may not be well hydrolyzed, and thereby, the Zn content may be too much in a clay. On the other hand, when more than 1.2M, its hydrolysis speed may be so fast that it forms zinc oxide.

The hydrolyzed product is agitated and then, dried, obtaining a supporter including a pillared clay filled with ZnO. The agitated product can be filtered before drying to reduce drying time and also to simplify the process.

The supporter may include 20 to 60 wt % of ZnO. When ZnO is included in an amount of less than 20 wt %, stability of the transformed clay may be too low, while when more than 60 wt %, a catalyst may have a low active component and thereby have deteriorated activity.

Next, the supporter is added to a Cu precursor solution. In one embodiment, the Cu precursor may include Cu nitrate, Cu acetate, Cu chloride, or a mixture thereof. These can also be used in hydrate form. In the Cu precursor solution, a solvent may include water.

In one embodiment, the Cu precursor may be added to form 20 to 40 wt % of CuO, but according to another embodiment of the present invention, it may be added to form 25 to 30 wt % of CuO.

When a Cu precursor is included to form less than 20 wt % of CuO, active sites may become smaller, but when more than 40 wt %, a catalyst may have deteriorated stability.

After the addition process, Cu, Au, Ru, Pt, Na, Ca, K, or a mixture thereof may be added to the obtained product as an additive. This addition process may generally include a wet immersion method. In one embodiment, Cu, Au, Ru, or Pt among the additives may be included in an amount of 1 to 5 wt %. According to another embodiment of the present invention, they may be included in an amount of 2.5 to 3 wt %. In an embodiment, Na, Ca, or K may be included in an amount of 0.01 to 0.5 wt %, but according to another embodiment of the present invention, they may be included in an amount of 0.1 to 0.2 wt %.

Then, the resulting mixture is calcinated to prepare a catalyst. In one embodiment, the calcination process may be performed at a temperature ranging from 300 to 500° C. When the calcination is performed at a temperature of less than 300° C., a catalyst may have deteriorated stability in the water gas shift reaction. On the contrary, when more than 500° C., the catalyst may have a limited pore structure. In an additional embodiment, the calcination process may be performed by heating the above mixture at a low increasing rate of about 1° C./min.

According to the procedure, a water gas shift catalyst is prepared. CuO and ZnO may be filled between clay layers or may be supported on clay as a supporter.

As the carbon monoxide oxidizing catalyst is used in a fuel cell system, the fuel cell system will be described referring to FIG. 1.

Figure 1:
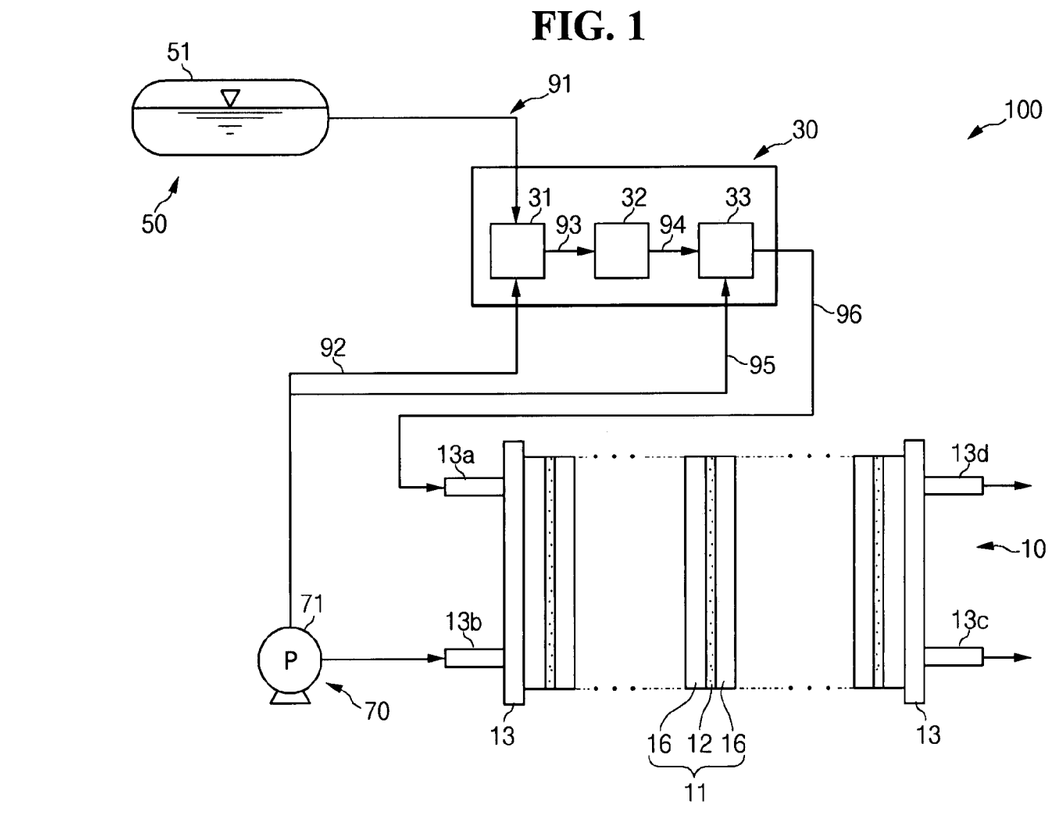
FIG. 1 is a schematic diagram showing the structure of a fuel cell system according to an embodiment of the present invention.

As shown in FIG. 1, the fuel cell system 100 includes a stack including an electricity generating element 11 that generates electrical energy through electrochemical reactions, and a reformer 30 that generates hydrogen gas from a liquid fuel and supplies the hydrogen gas; a fuel supplier 50 for supplying a fuel to the reformer 30; and an oxidant supplier 70 for supplying an oxidant to the reformer 30 and electricity generating element 11, respectively.

The electricity generating element 11 is formed as a minimum unit for generating electricity by disposing a membrane-electrode assembly (MEA) 12 between two separators 16 and then a stack 10 is formed with a stacked structure by arranging a plurality of minimum units. The membrane-electrode assembly 12 includes an anode and a cathode, and performs hydrogen gas oxidation and oxidant reduction reactions. The separators 16 supply hydrogen gas and oxidant through gas passage paths formed at both sides of the membrane-electrode assembly 12, and also function as a conductor connecting the anode and the cathode in series.

As shown in FIG. 1, the stack 10 can additionally include pressing plates 13 for positioning a plurality of the electricity generating elements 11 to be closely adjacent to each other at the outermost ends of the stack 10. However, the stack 10 of a fuel cell according to an embodiment can be formed by positioning the separators 16 at the outermost ends of the electricity generating element 11 to play a role of pressing the electricity generating elements 11 instead of using the separate pressing plates 13. On the contrary, the pressing plates 13 and 14 can be formed to intrinsically function as the separators 16 other than to closely arrange a plurality of electricity generating elements 11.

The pressing plate 13 includes a first inlet 13a to supply hydrogen gas to electricity generating element 11, a second inlet 13b to supply oxidant to the electricity generating element 11 from the oxidant supplier 70, a first outlet 13c to release hydrogen gas remaining after a reaction at the anode of the membrane-electrode assembly 12, and a second outlet 13d to release non-reacted air including moisture generated through a reduction reaction of oxidant at the cathode of the membrane-electrode assembly 12.

The reformer 30 has a structure for generating hydrogen gas from a fuel from chemical catalytic reactions using heat energy and for reducing carbon monoxide concentration in the hydrogen gas.

The reformer 30 includes a heat source 31 for commonly generating heat energy through a catalytic oxidation reaction of a fuel and oxidant, a reforming reaction portion 32 generating hydrogen gas from the fuel through a steam reforming catalyst reaction by the heat energy, and a carbon monoxide reduction portion 33 for reducing the concentration of carbon monoxide included in the hydrogen gas.

The heat source 31 is connected to a fuel tank 51 through a first supply line 91 and to an oxidant pump 71 through a second supply line 92. It passes a liquid fuel and an oxidant. In one embodiment, the heat source 31 includes a catalyst layer (not shown) that accelerates the oxidation reaction of the fuel with the oxidant to generate the heat energy. Herein, the heat source 31 is formed as a plate that provides a channel (not shown) that is capable of flowing in the liquid fuel and the oxidant. The surface of the channel is coated with the catalyst layer. The heat source 31 is shaped as a cylinder that has a predetermined internal space. The internal space may be filled with a catalyst layer such as a pellet type of catalyst module or a honey-comb type of catalyst module.

The reforming reaction portion 32 absorbs the heat energy generated from the heat source 31 to generate the hydrogen gas from the fuel through the steam-reforming catalyst reforming reaction of the fuel supplied from the fuel tank 51. The reforming reaction portion 32 is directly connected to the heat source 31 via a third supply line 93. In addition, the reforming reaction portion 32 includes a catalyst layer (not shown) for generating the hydrogen gas by accelerating the steam reforming reaction of the fuel. Herein, the heat source 32 includes a channel (not shown) capable of flowing in the fuel. The surface of the channel is coated with the catalyst layer. The heat source 32 is shaped as a cylinder that has a predetermined internal space. The internal space may be filled with a catalyst layer such as a pellet type of catalyst module or a honey-comb type of catalyst module.

The carbon monoxide reduction portion 33 reduces the carbon monoxide concentration in the hydrogen gas through a preferential CO oxidation catalyst reaction of the hydrogen gas with the oxidant. The hydrogen gas is generated from the reformer reaction portion 32 and the air is supplied from the oxidant pump 71. The carbon monoxide reduction portion 33 is connected to the reformer reaction portion 32 via a fourth supply line 94, and to the oxidant pump 71 via a fifth supply line 95. Thus, it passes the hydrogen gas and the oxidant. The carbon monoxide reduction portion 33 may include a catalyst layer (not shown) including a catalyst. The catalyst accelerates the preferential oxidation reaction to reduce the carbon monoxide concentration included in the hydrogen gas. Herein, the carbon monoxide reduction portion 33 includes a channel (not shown) that is capable of flowing in the fuel. The surface of the channel is coated with the catalyst layer. The carbon monoxide reduction portion 33 is shaped as a cylinder that has a predetermined internal space. The internal space may be filled with a catalyst layer such as a pellet type of catalyst module or a honey-comb type of catalyst module.

In one embodiment, the carbon monoxide reduction portion 33 is connected to the first inlet 13a of the stack 10 via a sixth supply line 96. It provides the electricity generating element 11 of the stack 10 with the hydrogen gas in which the carbon monoxide concentration is reduced through the carbon monoxide reduction portion 33. In addition, the carbon monoxide reduction portion 33 may include thermally conductive stainless steel, aluminum, copper, iron and so on.

The membrane-electrode assembly that constitutes the electricity generating element of the above fuel cell system includes a cathode and an anode, and a polymer electrolyte membrane interposed between the cathode and anode.

The cathode and anode include an electrode substrate and a catalyst layer.

In one embodiment, the catalyst layer includes a platinum-based catalyst selected from the group consisting of platinum, ruthenium, osmium, platinum-ruthenium alloys, platinum-osmium alloys, platinum-palladium alloys, platinum-M alloys (where M is a transition element selected from the group consisting of Ga, Ti, V, Cr, Mn, Fe, Co, Ni, Cu, Zn, Sn, Mo, W, Rh, Ru, and combinations thereof), and combinations thereof. More specifically, non-limiting examples of the platinum-based catalyst are selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, Pt/Ru/Sn/W, and combinations thereof.

Such a metal catalyst may be used in the form of a metal itself (black catalyst), or one supported on a supporter. In one embodiment, the supporter may include carbon such as graphite, denka black, ketjen black, acetylene black, carbon nanotubes, carbon nanofiber, carbon nanowire, carbon nanoballs, or activated carbon, or an inorganic particulate such as alumina, silica, zirconia, or titania. The carbon can be generally used. When the catalyst includes a noble metal supported on a supporter, it may include any one available in the market or one prepared by carrying a noble metal on a supporter. The process for supporting a noble metal on a supporter is well known to those having skills in the art, so details thereof are omitted.

The catalyst layer may further include a binder resin to improve its adherence and proton transference. In one embodiment, the binder resin may be a proton conductive polymer resin having a cation exchange group at its side chain selected from the group consisting of a sulfonic acid group, a carboxylic acid group, a phosphoric acid group, a phosphonic acid group, and derivatives thereof. Non-limiting examples of the polymer include at least one proton conductive polymer selected from the group consisting of fluoro-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, polyetherketone sulfide, aryl ketone, poly(2,2'-(m-phenylene)-5,5'-bibenzimidazole), and poly(2,5-benzimidazole).

The H may be substituted with Na, K, Li, Cs, or tetrabutylammonium in an ion exchange group of the terminal end at the proton conductive polymer. When the H is substituted with Na in an ion exchange group at the terminal end of the proton conductive group, NaOH is used. When the H is substituted with tetrabutylammonium, tetrabutylammonium hydroxide is used. K, Li, or Cs can also be replaced by using appropriate compounds. A method of replacing H is known in this related art, and therefore is not described in detail.

The binder resin may be used singularly or as a mixture. Optionally, the binder resin may be used along with a non-conductive polymer to further improve adherence strength between a polymer electrolyte membrane and the catalyst layer. The use amount of the binder resin may be adjusted to its usage purpose.

Non-limiting examples of the non-conductive polymer include polytetrafluoroethylene (PTFE), tetrafluoroethylene-hexafluoropropylene copolymers (FEP), tetrafluoroethylene-perfluoro alkyl vinylether copolymers (PFA), ethylene/tetrafluoroethylene (ETFE), ethylenechlorotrifluoro-ethylene copolymers (ECTFE), polyvinylidene fluoride, polyvinylidene fluoride-hexafluoropropylene copolymers (PVdF-HFP), dodecyl benzene sulfonic acid, sorbitol, and combinations thereof.

The electrode substrate supports the electrode, and provides a path for diffusing and transferring the fuel and oxidant to the catalyst layer. In one embodiment, the electrode substrate is formed from a material such as carbon paper, carbon cloth, or carbon felt, or a metal cloth that includes a metal film formed on a surface of porous cloth film or a cloth composed of polymer fibers, but the electrode substrate is not limited thereto.

The electrode substrate may include water-repellent fluoro-based resins to prevent the deterioration of diffusion efficiency due to the water generated during the operation of a fuel cell. In one embodiment, the fluoro-based resin may include polytetrafluoroethylene, polyvinylidene fluoride, polyhexafluoropropylene, polyperfluoroalkylvinylether, polyperfluorosulfonylfluoride alkoxyvinyl ether, fluorinated ethylene propylene, polychlorotrifluoroethylene, or a copolymer thereof.

A microporous layer (MPL) may be added between the aforementioned electrode substrate and catalyst layer to increase reactant diffusion effects. The microporous layer generally includes conductive powders with a certain particle diameter. The conductive material may include, but is not limited to, carbon powder, carbon black, acetylene black, activated carbon, carbon fiber, fullerene, nano-carbon, or combinations thereof. The nano-carbon may include a material such as carbon nanotubes, carbon nanofiber, carbon nanowire, carbon nanohorns, carbon nanorings, or combinations thereof.

The microporous layer is formed by coating a composition including a conductive powder, a binder resin, and a solvent on the electrode substrate. The binder resin may include, but is not limited to, polytetrafluoroethylene, polyvinylidenefluoride, polyhexafluoropropylene, polyperfluoroalkylvinylether, polyperfluorosulfonylfluoride, alkoxyvinyl ether, polyvinylalcohol, cellulose acetate, or copolymers thereof. The solvent may include, but is not limited to, an alcohol such as ethanol, isopropylalcohol, n-propylalcohol, butanol, and so on, water, dimethylacetamide, dimethylsulfoxide, N-methylpyrrolidone, tetrahydrofuran, and so on. The coating method may include, but is not limited to, screen printing, spray coating, doctor blade methods, gravure coating, dip coating, silk screening, painting, and so on, depending on the viscosity of the composition.

The polymer electrolyte membrane may be any proton conductive polymer having a cation exchange group at its side chain selected from the group consisting of a sulfonic acid group, a carboxylic acid group, a phosphoric acid group, a phosphonic acid group, and derivatives thereof.

Non-limiting examples of the polymer resin include at least one proton conductive polymer selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly(2,5-benzimidazole). The H may be substituted with Na, K, Li, Cs, or tetrabutylammonium in an ion exchange group of the terminal end at the proton conductive polymer. When the H is substituted with Na in an ion exchange group at the terminal end of the proton conductive group, NaOH is used. When the H is substituted with tetrabutylammonium, tetrabutylammonium hydroxide is used. K, Li, or Cs may also be substituted by using appropriate compounds. A method of replacing H is known in the related art, and therefore is not described in detail.

The following examples illustrate the present invention in more detail. However, it is understood that the present invention is not limited by these examples.

EXAMPLE 1

Montmorillonite was added to a Zn nitrate aqueous solution in a 1 wt % concentration. The amount of the Zn nitrate aqueous solution was controlled until the amount of Zn was 2.75 mmole per 1 g of montmorillonite.

An ammonia hydroxide aqueous solution was added to the obtained mixture solution to hydrolyze, and the base was regulated up to 1.1M based on 1M of Zn.

The hydrolyzed product was stirred for 24 hours and then filtered. The filtered product was dried at 200° C. to prepare a supporter.

The supporter was impregnated in a $Cu(NO_3)_2 \cdot 3H_2O$ water solution. The impregnated product was calcinated at 500° C. to prepare a catalyst. Herein, 1.318073 g of $Cu(NO_3)_2 \cdot 3H_2O$ was used based on 1 g of the supporter. The prepared water gas shift catalyst included 25 wt % of ZnO and 30 wt % of CuO.

Then, a water gas shift catalyst according to Example 1 was measured regarding a CO conversion rate depending on the temperature. The results are provided in FIG. 2. The measurement conditions were as follows.

Figure 2:
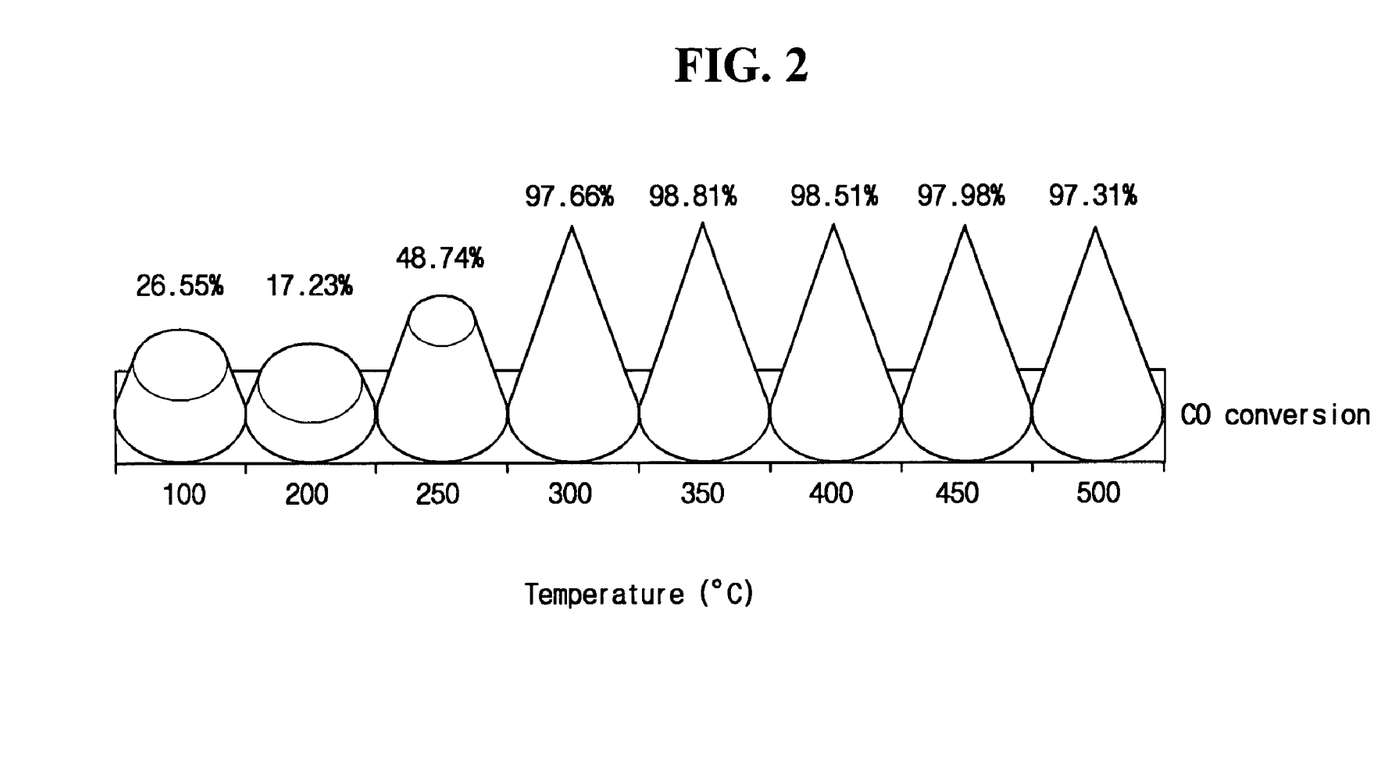
FIG. 2 is a chart showing a CO conversion rate (removing rate) of the water gas shift catalyst according to Example 1 of the present invention.

Loading amount of the catalyst in a reactor: 30 ml
Gas flow rate input: 380 ml/min
Output flow rate: 430 ml/min
Water (liquid): 0.11 ml/min
Reaction gas components: $CO_2$=19.20%/CO=10.10%/$N_2$=5.01%/$H_2$=65.69%
Space velocity (without water): 800 $h^{-1}$ Furthermore, SHT 4, a commercially available water gas shift catalyst, (SH4 includes 89 wt % of iron oxide, 2 wt % of chrominum oxide, 7 wt % of chromium trixoxide, and 2 wt % of copper oxide, granules with size of about 3.2×3.2 mm, Engelhard corporation) was measured regarding a CO conversion rate depending on temperature as a Comparative Example 1. The results are provided in FIG. 3. The measurement conditions were as follows.

Figure 3:
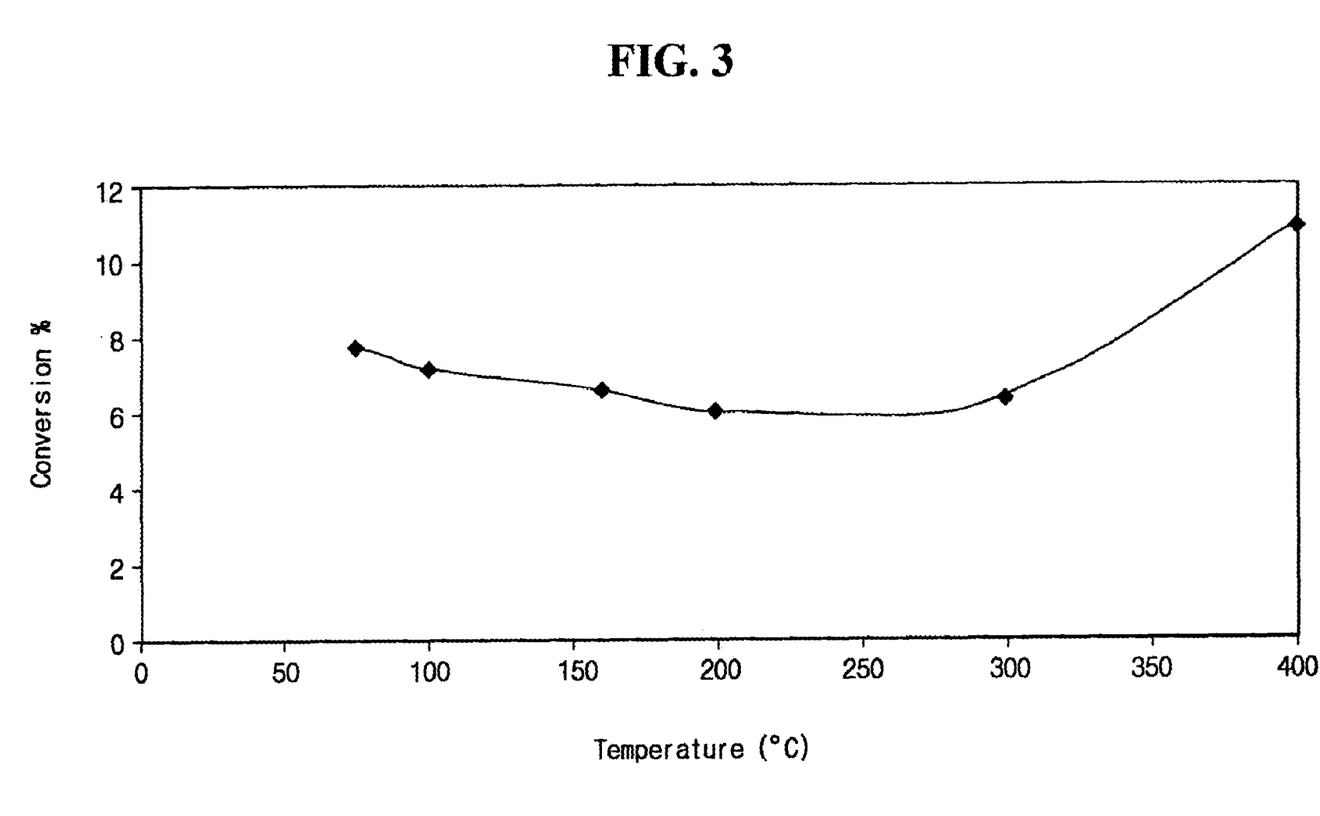
FIG. 3 is a graph showing a CO conversion rate (removing rate) of the water gas shift catalyst according to Comparative Example 1 of the present invention.

Loading amount of the catalyst in a reactor: 20 ml
Reaction gas fluid speed: 380 ml/min
Reaction gas releasing speed: 430 ml/min
Water (liquid): 0.11 ml/min
Reaction gas components: CO2=19.20%/CO=10.10%/N2=5.01%/H2=65.69%
Space velocity (without water): 1200 $h^{-1}$ As shown in FIGS. 2 and 3, a catalyst of Example 1 has a better carbon monoxide conversion rate than one of Comparative Example 1 in every way; that is to say, a water gas shift reaction for reducing carbon monoxide occurred more effectively in a catalyst of Example 1 than one of Comparative Example 1.

Figure 4:
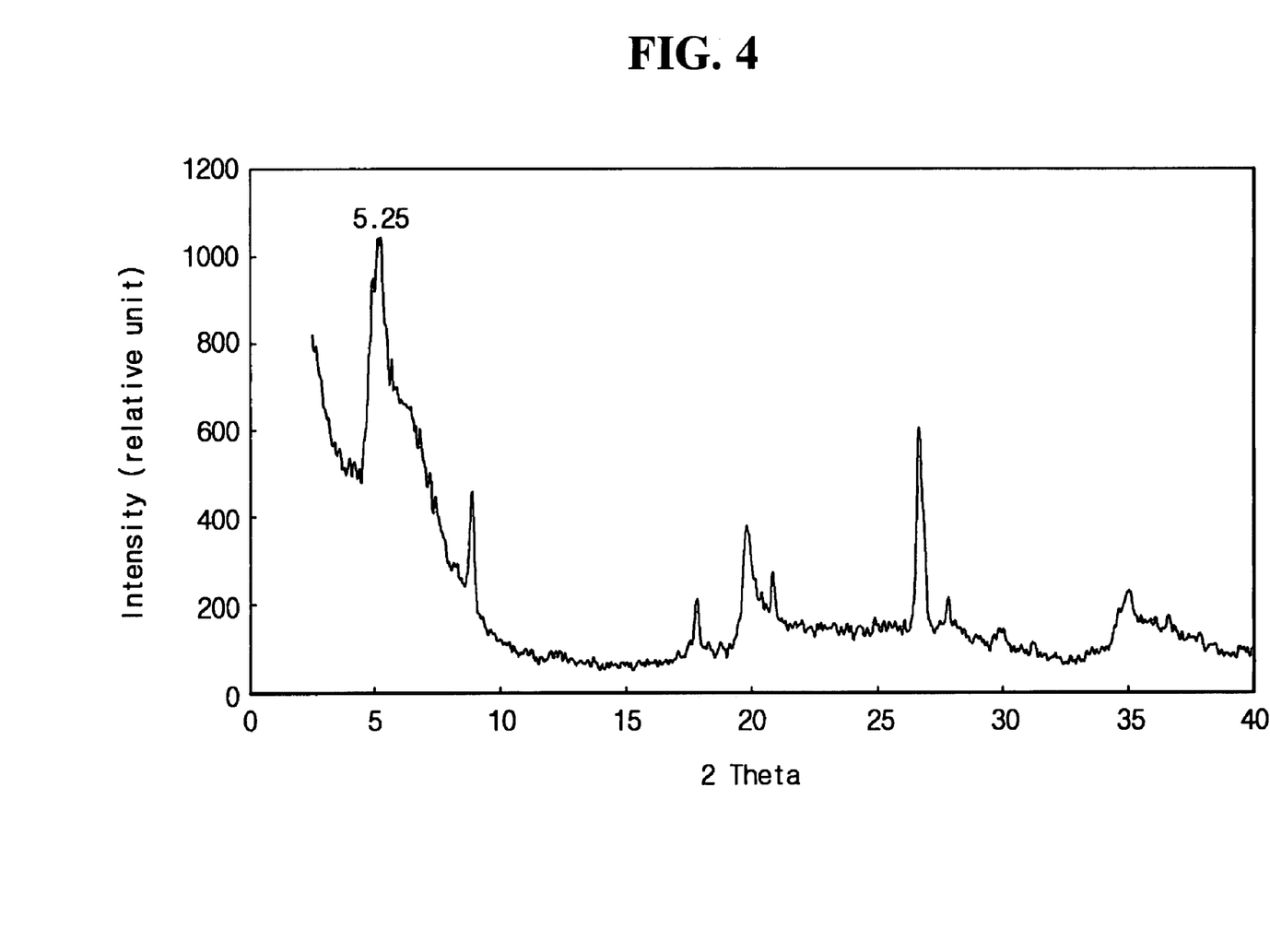
FIG. 4 is a graph showing an X-ray diffraction of the supporter according to Example 1 of the present invention.
Figure 5:
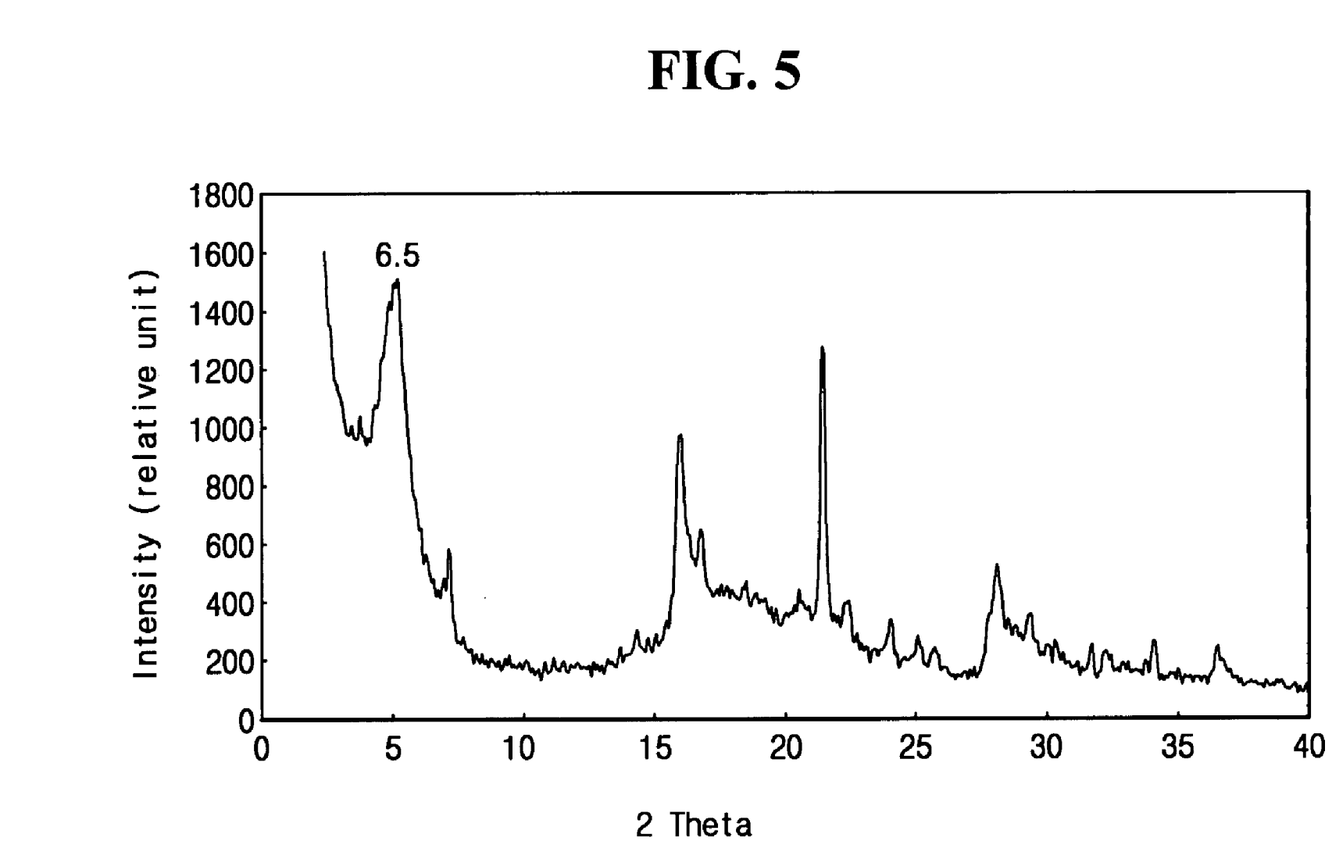
FIG. 5 is a graph showing an X-ray diffraction of the supporter used in the Comparative Example.

In addition, X-ray diffraction of a supporter prepared by Example 1 and a supporter used in Comparative Example 1 were measured. The results are provided in FIGS. 4 and 5. As shown in FIGS. 4 and 5, 2θ of Example 1 is smaller than that of Comparative Example 1, the distance between the layers of the clay, which is in inverse proportion to 2θ, is wider than that of Comparative Example 1. Thus, it can be expected that ZnO is filled between the layers of the clay according to Example 1.

Judging from the results, a water gas shift catalyst for a reformer of a fuel cell system of the present invention had excellent water gas shift efficiency.

While this invention has been described in connection with what is considered to be exemplary embodiments, it is to be understood that the invention is not limited to the disclosed embodiments, but, on the contrary, is intended to cover various modifications and equivalent arrangements included within the spirit and scope of the appended claims.

What is claimed is:

1. A water gas shift catalyst for a reformer of a fuel cell system, comprising:
   a supporter including a plurality of layers of a clay with ZnO between the layers of clay; and,
   an active material including CuO supported on the supporter.

2. The water gas shift catalyst of claim 1, wherein the CuO is supported in an amount in the range of 20 to 40 wt %.

3. The water gas shift catalyst of claim 2, wherein the CuO is supported in an amount in the range of 25 to 30 wt %.

4. The water gas shift catalyst of claim 1, wherein the ZnO is included in an amount in the range of 20 to 40 wt % and the CuO is included in an amount in the range of 20 to 40 wt %.

5. A water gas shift catalyst for a reformer of a fuel cell system, comprising:
   layers of a clay; and
   ZnO and CuO filled between layers of the clay.

6. The water gas shift catalyst of claim 5, wherein the ZnO is included in an amount in the range of 20 to 40 wt % and the CuO is included in an amount in the range of 20 to 40 wt %.

7. A fuel cell system comprising:
   a reformer comprising
      a reforming reaction portion adapted to generate hydrogen gas from a fuel through a catalyst reforming reaction using heat energy, and
      a carbon monoxide reducing portion adapted to reduce carbon monoxide concentration in the hydrogen gas through an oxidation reaction of hydrogen gas with an oxidant;
   at least one electricity generating element adapted to generate electrical energy by electrochemical reactions of the hydrogen gas and the oxidant;
   a fuel supplier adapted to supply the fuel to the reforming reaction portion;
   an oxidant supplier adapted to supply the oxidant to the carbon monoxide reduction portion and electricity generating element; and
   a cooler adapted to cool heat generated from the carbon monoxide reduction portion by circulating the fuel supplied to the reforming reaction portion, to the carbon monoxide reduction portion,
   wherein the reformer comprises a water gas shift catalyst comprising a supporter including a plurality of layers of a clay with ZnO between layers of the clay, and an active material including CuO supported on the supporter.

8. The fuel cell system of claim 7, wherein the CuO is supported in an amount in the range of 20 to 40 wt %.

9. The fuel cell system of claim 8, wherein the CuO is supported in an amount in the range of 25 to 30 wt %.

10. The fuel cell system of claim 7, wherein the ZnO is included in an amount in the range of 20 to 40 wt % and the CuO is included in an amount in the range of 20 to 40 wt %.

11. A fuel cell system comprising:
a reformer comprising
 a reforming reaction portion adapted to generate hydrogen gas from a fuel through a catalyst reforming reaction using heat energy, and
 a carbon monoxide reducing portion adapted to reduce the carbon monoxide concentration in the hydrogen gas through an oxidation reaction of hydrogen gas the with an oxidant;
at least one electricity generating element adapted to generate electrical energy by electrochemical reactions of the hydrogen gas and the oxidant;
a fuel supplier adapted to supply the fuel to the reforming reaction portion;
an oxidant supplier adapted to supply the oxidant to the carbon monoxide reduction portion and electricity generating element, respectively; and
a cooler adapted to cool heat generated from the carbon monoxide reduction portion by circulating the fuel supplied to the reforming reaction portion, to the carbon monoxide reduction portion,
wherein the reformer comprises a water gas shift catalyst comprising layers of a clay; and ZnO and CuO intercalated between layers of the clay.

12. The fuel cell system of claim 11, wherein the ZnO is included in an amount in the range of 20 to 40 wt % and the CuO is included in an amount in the range of 20 to 40 wt %.

13. The fuel cell system of claim 7, wherein the clay is selected from the group consisting of pyrophylite-talc, montmorillonite (MMT), hectorite, fluorohectorite, saponite, kaolinite, vermiculite, illite, mica, brittle mica, and combinations thereof.

14. The fuel cell system of claim 7 wherein the layers of clay are spaced from one another by from 13 to 18 Å.

15. The water gas shift catalyst of claim 1, wherein the clay is selected from the group consisting of pyrophylite-talc, montmorillonite (MMT), hectorite, fluorohectorite, saponite, kaolinite, vermiculite, illite, mica, brittle mica, and combinations thereof.

16. The water gas shift catalyst of claim 1 wherein the layers of clay are spaced from one another by from 13 to 18 A.

* * * * *

UNITED STATES PATENT AND TRADEMARK OFFICE
CERTIFICATE OF CORRECTION

PATENT NO. : 7,514,167 B2 Page 1 of 1
APPLICATION NO. : 11/655406
DATED : April 7, 2009
INVENTOR(S) : Leonid Gorobinskiy It is certified that error appears in the above-identified patent and that said Letters Patent is hereby corrected as shown below:

In the Claims:

| | |
|---|---|
| Column 10, line 66, Claim 7 | After "between" insert -- the -- |
| Column 11, line 16, Claim 11 | Delete "the" |

Signed and Sealed this

Sixteenth Day of February, 2010

David J. Kappos
*Director of the United States Patent and Trademark Office*